Sept. 27, 1960  G. W. CORNELIUS  2,953,898
AFTERBURNER APPARATUS
Filed Oct. 22, 1956  3 Sheets-Sheet 1
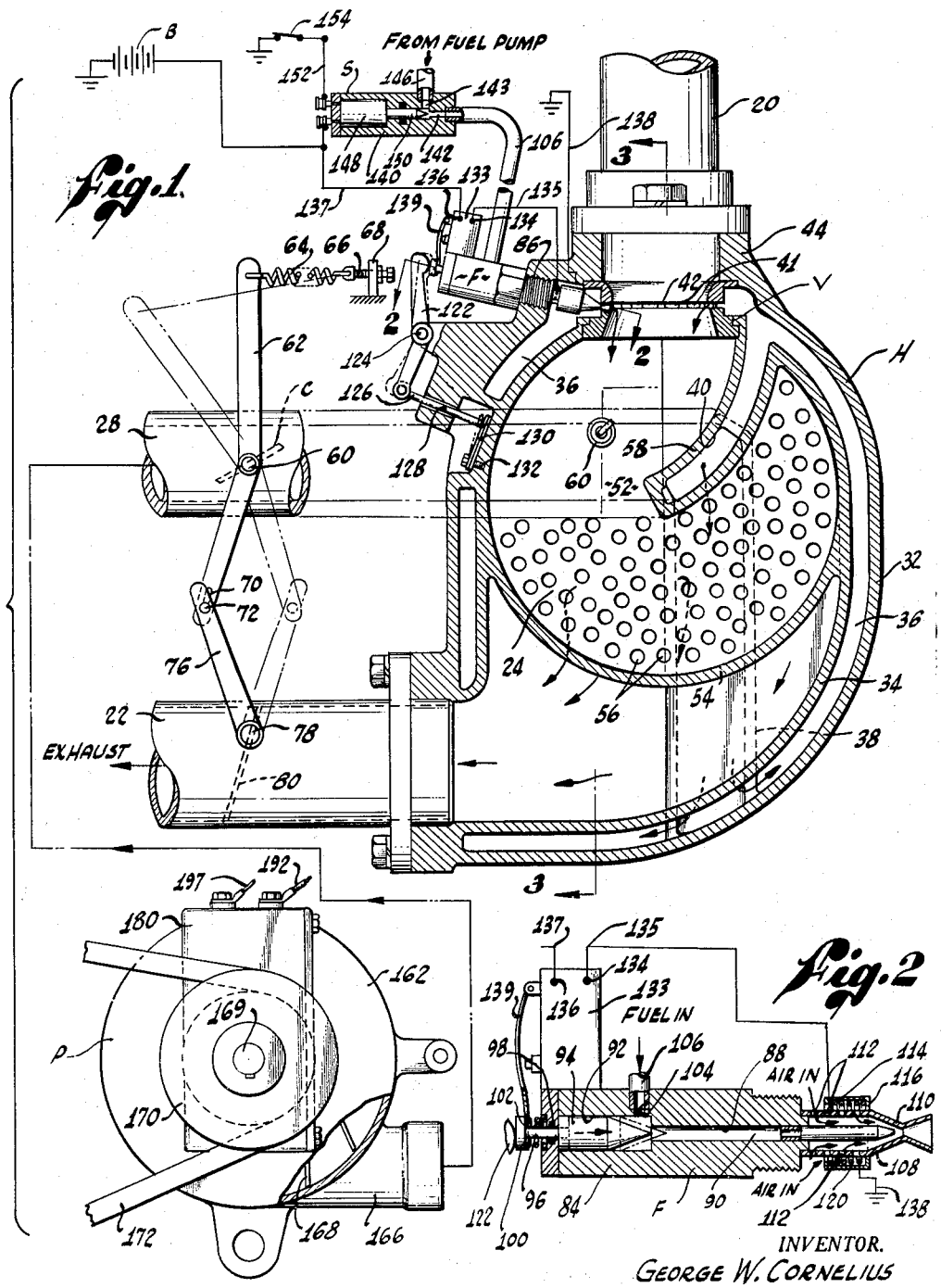
INVENTOR.
GEORGE W. CORNELIUS
BY
Fulwider Mattingly & Huntley
ATTORNEYS

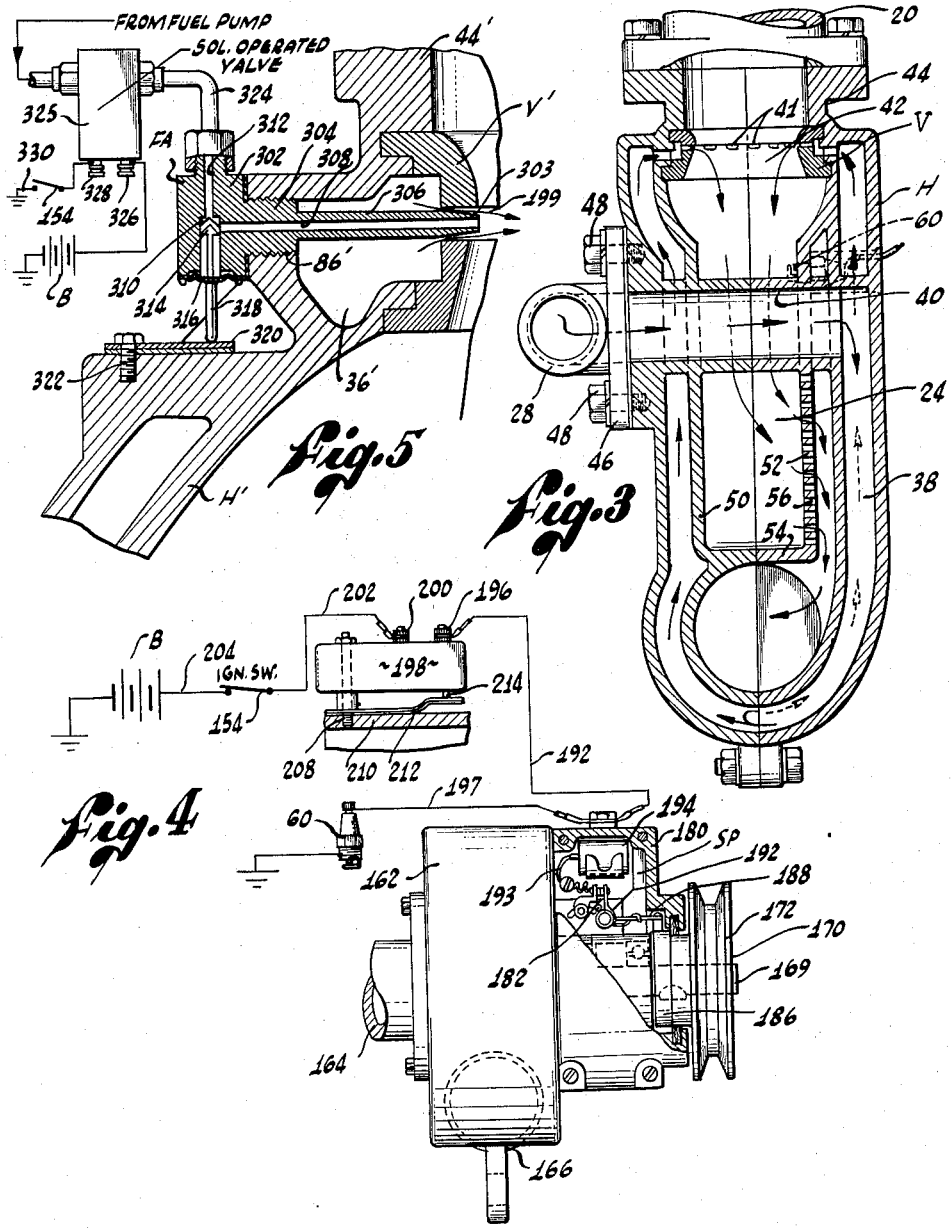

INVENTOR.
GEORGE W. CORNELIUS
ATTORNEYS

United States Patent Office 2,953,898
Patented Sept. 27, 1960

2,953,898
AFTERBURNER APPARATUS

George W. Cornelius, Portuguese Bend, Calif., assignor to Holley Carburetor Company, Van Dyke, Mich.

Filed Oct. 22, 1956, Ser. No. 617,301

25 Claims. (Cl. 60—30)

The present invention relates generally to the field of internal combustion engines and more particularly to afterburner apparatus for consuming the unburned products of combustion exhausted from an internal combustion engine.

It is well known that the unburned products of combustion exhausted from the internal combustion engines of automotive vehicles constitute a prime source of the so-called "smog" which exists in and around the principal population centers of the country. The harmful effects of this smog upon both animate and inanimate objects are likewise very well known. Although many forms of afterburner apparatus for consuming these unburned products of combustion have been heretofore proposed, such devices have for various reasons proven to be unsatisfactory and accordingly are not now in general usage It is a major object of the present invention to provide novel afterburner apparatus for purifying the unburned products of combustion exhausted from an internal combustion engine.

Another object is to provide afterburner apparatus which may be employed with internal combustion engines of the diesel type or internal combustion engines of the spark ignition type.

Another object is to provide afterburner apparatus including a housing that receives exhaust gases, which exhaust gases are mixed with heated fresh air in a combustion chamber, so as to consume the unburned constituents of the exhaust gas. Means are also provided for supplying fuel to the incoming fresh air during certain operating conditions of the engine.

A further object of the invention is to provide afterburner apparatus of the aforedescribed nature including means for automatically controlling the amount of fresh air admitted to the burning chamber in accordance with the operating conditions of the engine.

An additional object is to provide afterburner apparatus of the aforedescribed nature incorporating unique means for introducing heated fuel to the combustion chamber during initial operation of the engine, the introduction of such heated fuel being automatically cut off when the engine reaches its normal operating temperature.

Another object of the invention is to provide afterburner apparatus that is comparatively simple in design and rugged of construction whereby it may afford a long and trouble free service life.

Yet an additional object is to provide afterburner apparatus that may be readily installed upon the engine of any conventional automotive vehicle.

It is yet another object to provide afterburner apparatus that is foolproof and entirely automatic in operation.

These and other objects and advantages of the present invention will become more apparent from the following detailed description when taken in conjunction with the appended drawings wherein:

Figure 1 is a side elevational view of a first form of afterburner apparatus embodying the present invention;

Figure 2 is an enlarged central vertical sectional view of a fuel admitting member employed with said apparatus;

Figure 3 is a sectional view taken on lines 3—3 of Figure 1;

Figure 4 is a view of a detail of said afterburner apparatus;

Figure 5 is a vertical sectional view of a modified form of fuel admitting member incorporated in said apparatus.

GENERAL ARRANGEMENT OF FIGURES 1–4

Figure 6:
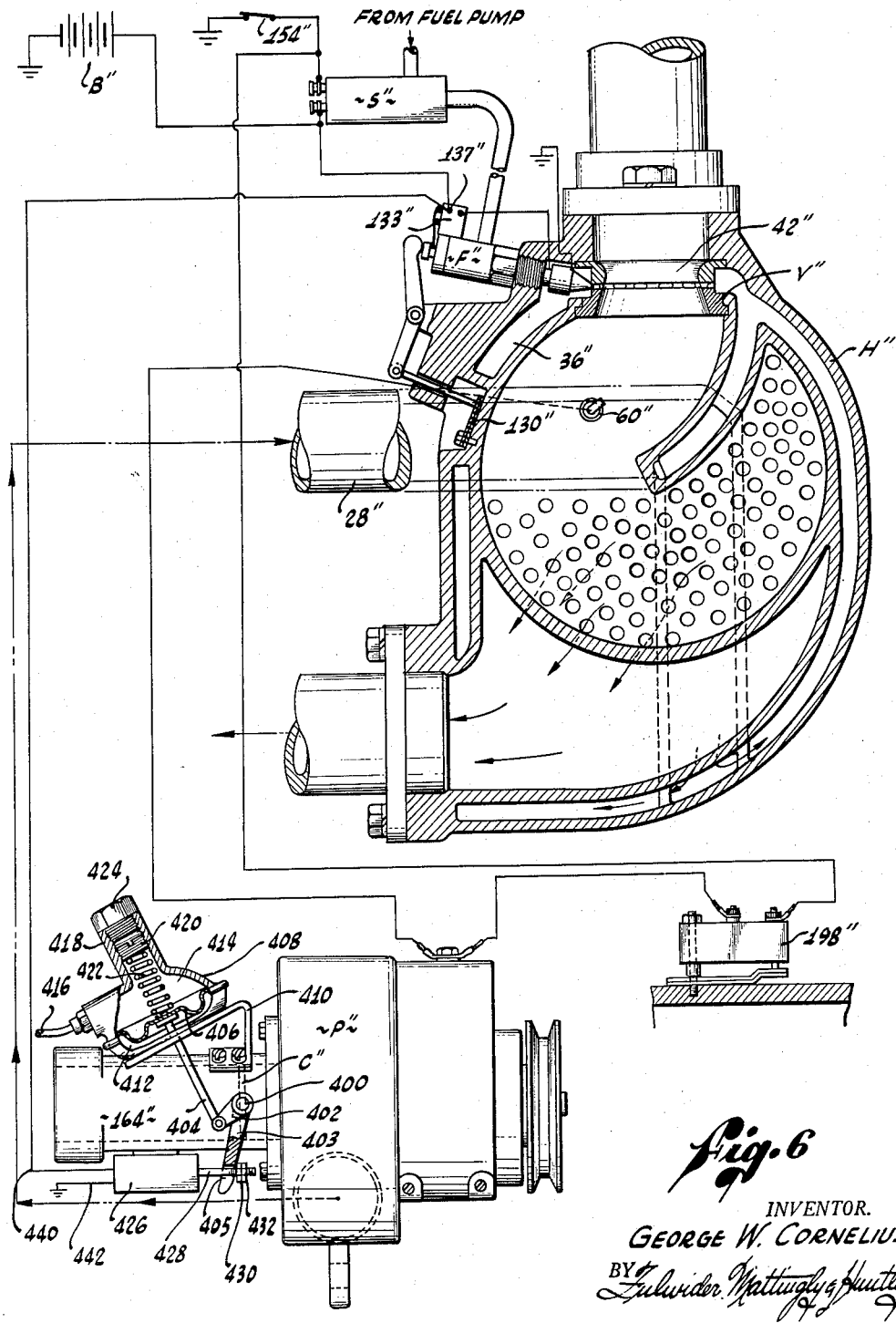
Figure 6 is a side elevational view of a second form of afterburner apparatus embodying the present invention and particularly adapted for use with a spark ignition engine.

Referring to the drawings, the first form of afterburner apparatus embodying the present invention is particularly adapted for use with a diesel type engine. It includes a housing H having its upper end in communication with the exhaust pipe 20 of the engine (not shown) of an automotive vehicle and its lower portion in communication with a tail pipe 22. The interior of the housing H defines a burning chamber 24 for engine exhaust gases entering through the exhaust pipe 20. A fresh air inlet tube 28 directs fresh air into one side of the housing H. The fresh air inlet tube 28 is in communication with the discharge of an air pump P. The amount of fresh air admitted through the inlet pipe 28 is regulated by a control valve C disposed therewithin. A fuel admitting member F is mounted at the upper portion of the housing H. This fuel admitting member F is adapted to admit fuel into the burning chamber 24 in a manner to be fully described hereinafter. The fuel admitting member F receives fuel from a fuel shut-off member S in a manner to be described hereinafter.

The housing H

More particularly, as indicated in Figures 1 and 3, the housing H is formed in two halves and includes generally vertically extending outer walls 32. Spaced inwardly from the outer walls 32 are inner walls 34 having a configuration approximating that of the outer walls. The space 36 between the inner and outer walls is in communication with a fresh air passage 38 having its upper end in communication with a horizontally extending intake duct 40 connected to the fresh air inlet pipe 28. The upper portion of the space 36 is in communication with a plurality of openings 41 formed in the throat 42 of a venturi tube V arranged in the upper portion of the housing. The venturi tube V is coaxially disposed within an exhaust gas inlet boss 44 that is bolted to the exhaust pipe 20. The fresh air inlet tube 28 is formed with a flange 46 which is rigidly affixed by bolts 48 to one side of the housing H, as indicated in Figure 3.

The burning chamber 24 is defined by a generally arcuate space defined within the housing H by a pair of generally vertically extending walls 50 and 52, and a curved horizontally extending wall 54. One of the generally vertically extending walls 52 is formed with a plurality of apertures 56. An arcuate deflector 58 extends downwardly from the upper portion of one side of the housing H in the path of the exhaust gases forced through the venturi V. A conventional spark plug 60 is mounted within the burning chamber 24 to one side of the deflector 58. Referring to Figure 4, the spark plug 60 is connected to a spark producing unit SP to be fully described hereinafter.

The control valve C

The control valve C is preferably of the butterfly type and is supported within the inlet tube 28 by a horizontally extending shaft 60. A generally V-shaped lever 62 has its mid-portion keyed to this shaft 60 exteriorly of the inlet tube 28. The upper end of this lever 62 is secured to one end of a tension spring 64. The opposite end of the tension spring 64 is connected to an adjustment bolt 66 carried by a fixed bracket 68. The lower end of the lever 62 is formed with an elongated slot 70 wherein a pin 72 is slidably disposed. The pin 72 is secured to the upper end of a crank arm 76. The lower end of the crank arm 76 is keyed to a horizontal shaft. It will be observed that this shaft 78 is arranged off-center relative to the tail pipe 22. This shaft 78 supports a second butterfly valve 80 within the tail pipe 22. Because of the off-center position of the shaft 78 the portion of the butterfly valve 80 below the shaft is appreciably larger in area than the portion above the shaft. Accordingly, the passage of exhaust gases through the tail pipe will tend to effect clockwise pivotal movement of the valve 80 towards an open position. Such clockwise movement will be yieldingly resisted by the tension spring 64. This movement will likewise effect concurrent counter clockwise movement of the control valve C towards a closed position by virtue of their interconnection through lever 62 and crank arm 76. With this arrangement, the velocity of the exhaust gases passing through the tail pipe 22 serves to automatically vary the volume of fresh air admitted through the inlet tube 28, the higher the velocity of the exhaust gases the lesser the degree of opening of the control valve C.

The fuel admitting member F

Referring particularly to Figures 1 and 2, the fuel admitting member F includes a cylindrical body 84 which has its front end threadably secured within a bore 86 formed in the upper portion of one side of the housing H. The body 84 is coaxially formed with a passage 88 wherein is secured a fuel admitting tube 90. The rear end of the passage 88 merges into a cavity 92 of enlarged diameter. A blocking element 94 having a generally conical front portion adapted to seat upon the rear end of the passage 88 is slidably disposed within the cavity 92. A post 96 affixed to the rear end of the blocking element 94 extends through a sealed bore 98 formed in the rear end of the body 84. The post 96 is formed with a head 100. A coil compression spring 102 interposed between the rear end of the body 84 and the underside of the head 100 constantly biases the blocking element 94 rearwardly within the cavity 92. A radially directed bore 104 extends outwardly from the front portion of the cavity 92. This bore 104 receives the lower end of a fuel conduit 106.

The threaded front end of the body 84 is of reduced diameter and integrally carries a coaxial air inlet tube 108. This air inlet tube 108 is formed in its front portion with a venturi portion 110 within the throat of which the front end of fuel admitting tube 90 terminates. The side walls of the air inlet tube rearwardly of the venturi portion 110 are formed with apertures 112. A cylinder 114 encompasses the apertured portion of the air inlet tube 108 and its front end is rigidly affixed thereto by a flange 116. The rear end of this cylinder 114 terminates forwardly of the rear end of the air inlet tube 108. A plurality of electric resistor heating coils 120 are disposed within the annular space separating the cylinder 114 and the apertured portion of the air inlet tube 108, for a purpose to be set forth hereinafter.

The head 100 abuts one of the free ends of a rocker arm 122 having its mid-portion pivotally affixed to one side of the housing H by a pin 124. The opposite end of the rocker arm 122 is pivotally connected to a post 126 having its intermediate portion slidably carried within a bore 128 formed through one side of the housing H. The inner end of this post 126 abuts a bimetallic temperature sensing element 130 which is fixed by a bolt 132 to one side of the housing H. With this arrangement, during initial operation of the automotive vehicle's engine the housing H will exist at a comparatively cool temperature. The bimetallic temperature sensing element 130 will at this time be disposed in its solid outline position of Figure 1. The rear end of the blocking element 94 will accordingly be maintained in a retracted position relative to the rear end of the passage 88 of the fuel admitting member F by the rocker arm 122. Accordingly, fuel will be free to flow through the fuel admitting member F.

An electric microswitch 133 is mounted on the upper rear portion of the fuel admitting member F. One terminal 134 of this switch 133 is connected by a lead 135 to one side of the electric resistor heating coils 120. The other terminal 136 is connected by a second lead 137 to a source of electric current, such as the automotive vehicle's battery B. The opposite side of the heating coils 120 is grounded by means of a lead 138. The switch 133 includes a pivotally supported actuator arm 139. The free end of this actuator arm 139 is engaged with the post 96 of the fuel admitting member F. With the parts of the fuel admitting member disposed in their solid outline position of Figures 1 and 2, the parts of the switch 133 will be arranged in an "on" position.

The fuel shut-off member S

As shown in Figure 1, the end of the fuel conduit 106 opposite the fuel admitting member F is connected to the fuel shut-off member S. The fuel shut-off member S includes a body 140 formed at its front end with a passage 142 that receives the upper end of the fuel conduit 106. The rear end of this passage 142 is in communication with a radially extending passage 143 that is connected to the automotive vehicle's fuel pump (not shown) by a conduit 146. Control of the flow of fuel through the passage 142 is effected by means of an electric solenoid type valve 148 having a pointed plunger 150 adapted to seat upon the rear end of this passage when the solenoid's windings are not excited. At such time as the solenoid's windings are excited, however, the plunger 150 will be maintained in its retracted position of Figure 1 so as to permit fuel to flow into the fuel conduit 106.

One side of the windings of the electric solenoid valve 148 are connected to ground by a lead 152. The engine's ignition switch 154 is interposed in this lead 152. The opposite side of the windings of the solenoid valve 148 is in communication with a source of electric current, such as the battery B of the automotive vehicle.

The air pump P

The air pump P is shown particularly in Figures 1 and 4, and as it will be apparent it is of conventional rotary vane construction having a case 162 formed with an intake tube 164 and a discharge fitting 166. The discharge fitting 166 is connected to the fresh air inlet tube 28. The rotor 168 of the pump is keyed to a shaft 169 that is in turn keyed to a pulley 170 rotated by means of a belt 172 connected to a complementary rotating pulley (not shown) driven by the internal combustion engine.

The spark producing unit SP

Referring now to Figure 4, the spark producing unit SP is partly contained in a housing 180 formed on the side of the pump case 162 opposite the latter's intake tube 164. This unit includes conventional ignition points 182 connected to a conventional electrical condenser 194. The ignition points 182 are caused to make and break during rotation of the shaft 169 by means of a cam 186 keyed to this shaft 169, the follower element 188 of the ignition points riding upon the periphery of this cam. One side of the ignition points 182 are connected by a lead 192 to the first terminal 196 of a bi-metallic thermostatic switch 198. The other side of these ignition points are connected by a lead 193 to one side of the condenser 194. The opposite side of the condenser 194 is connected by a lead 197 to the spark plug 60. The opposite terminal 200 of the switch 198 is connected by a lead 202 with the automotive vehicle's ignition switch 154. A lead 204 connects the ignition switch with the source of electric current B.

The switch 198 is affixed by a bolt 208 to a wall 210 of the automotive vehicle's engine. This wall 210 exists at the temperature of the engine and will undergo a temperature rise during operation of the engine. The switch 198 includes a bimetallic strip 212 which directly abuts the exterior of the engine wall 210. The free end of the bimetallic strip 212 is in contact with the actuating post 214 of the switch 198. It is to be understood that at normal operating temperatures of the automotive vehicle's engine, the bimetallic strip 218 will urge the actuating post 214 to an "on" position so that an electrical circuit will be completed between the source of current B, the ignition points 182, the condenser 194 and the spark plug 60. With this arrangement, the spark plug 60 will not be energized until the engine (and hence the interior of the housing H) has been heated to a predetermined temperature. This insures against the occurrence of an explosion within the housing H should a leakage of fuel thereinto take place while the engine is inoperative.

*Operation of the apparatus of Figures 1–4*

Referring to Figure 1, when the ignition switch 154 is closed electric current will flow from the current source B to the windings of the solenoid 148 of the fuel shut-off member S. Accordingly, the solenoid's plunger 150 will be drawn to its retracted position of this figure so as to permit fuel to flow into the fuel conduit 106. Assuming that the engine is initially cold, the bimetallic strip 130 will be arranged in its position of Figure 1, i.e. the blocking element 94 of the fuel admitting member F will be arranged in its retracted position. Accordingly, fuel will be free to flow through the fuel admitting tube 90 of the fuel admitting member F. Additionally, the electric switch 133 will have its parts arranged to an "on" position. Thus, electric current will pass through the electric resistor heater coils 120 of the fuel heating member F. If the automotive vehicle's engine is now started, the pump P will force fresh air through the inlet tube 28 into the fresh air passage 38. This incoming fresh air will be forced through the space 36 through the openings 41 formed in the throat 42 of the venturi tube V. In accordance with Bernoullis Theorem the passage of exhaust gases through the venturi's throat 42 from the exhaust pipe 20 will assist in drawing the fresh air through the openings 41.

Referring now to Figure 2, a portion of the fresh air flowing through the upper portion of the housing space 36 will pass into the interior of the air inlet tube 108 as indicated by the directional arrows. Such air movement will create a low pressure area in the throat of the venturi portion 110 of the tube 108. This arrangement will tend to accelerate the flow of fuel through the fuel admitting tube 90 and to effect its thorough intermixing with the incoming fresh air. The fresh air entering the interior of the air inlet tube 108 will be heated because of its contact with the heating coils 120. Accordingly, in this manner, there will be effected the introduction of thoroughly mixed, heated fresh air and fuel into the throat of the venturi V.

This heated mixture will be further heated and mixed by the hot exhaust gases from exhaust pipe 20 and upon contacting the energized spark plug 60 combustion of the mixed fuel, air and exhaust gas will occur. Such combustion will serve to consume a major portion of the unburned contaminants contained in the exhaust gases. When the temperature within the burning chamber 24 reaches a predetermined maximum it is no longer necessary to introduce fuel into the housing H. The bimetallic temperature sensing element 130 should be arranged to move to its dotted outline position of Figure 1 when this temperature is reached. This movement will cause the rocker arm 122 to urge the blocking element 94 of the fuel admitting member F forwardly until its conical front end seats against the rear of the passage 88. In this manner, the flow of fuel through this passage will be blocked. This forward movement of the blocking member 94 will additionally cause the actuator arm 139 of the microswitch 133 to move the parts of this switch to an "off" position. Thus, the flow of electric current to the electric resistance heater coils 120 will cocurrently be cut off.

As mentioned hereinabove, the amount of fresh air admitted to the housing H is controlled by the control valve C. The position of this control valve C is automatically adjusted by position of the unbalanced butterfly valve 80 disposed in the tail pipe 22. The position of the unbalanced butterfly valve 80 is directly responsive to the operating conditions of the engine, the higher the exhaust gas velocity the greater the extent of opening of the control valve C. With this arrangement, the volume of fresh air introduced into the housing H will automatically be adjusted to fit the operating requirements of the engine. In this regard, with a diesel type engine, the wider the throttle setting, the greater the volume of exhaust gas issuing therefrom. Further, the amount of fresh air required to effect optimum combustion of the unburned contaminants of the exhaust gas is proportional to the volume of such exhaust gas.

*The alternate fuel admitting member FA of Figure 5*

Referring now to Figure 5 there is disclosed an alternate form of fuel admitting member FA which may be employed with the aforedescribed apparatus of Figures 1–4. This form of fuel admitting member FA is mounted at the upper portion of the housing H' in a similar manner to that described in conjunction with the fuel admitting member F. The housing H' is formed with a venturi tube V' having a throat 199 formed with a plurality of circumferentially spaced air-receiving openings, as in the case of the aforedescribed venturi V. The fuel admitting member FA includes a body 302 having an externally threaded boss 304 secured in a bore 86' of the housing H'. A fuel admitting tube 306 extends from the inner end of the boss 304 through an opening 303 in the venturi V'. A passage 308 extends through the boss 304 and the fuel inlet tube 306. The end of this passage 308 remote from the venturi V' intersects a vertical cavity 310 formed in the lower portion of the body 302. An upwardly extending bore 312 forms a continuation of the cavity 310. A blocking element 314 having a frustroconical upper end adapted to seat against the lower end of the bore 312 is slidably disposed within the cavity 310. A diaphragm seal 316 is provided for the lower end of this blocking element 314. A vertical post 318 depends from the underside of the blocking element 314. The lower end of this post 318 abuts a bimetallic temperature sensing element 320 which is secured against the exterior surface of the housing H' by a bolt 322. The upper end of the bore 312 is connected to a fuel conduit 324. This fuel conduit 324 extends to the fuel pump (not shown) of the automotive vehicle. An electric solenoid valve 325 is interposed in the fuel conduit 324. One terminal 326 of this switch 325 is connected to the source of current B while the other terminal 328 is connected to one side of the ignition switch 154. The opposite side of the ignition switch 154 is grounded by a lead 330.

In the operation of the alternate fuel admitting member FA, when the ignition switch 154 is turned on, a circuit will be completed through the windings of the solenoid valve 225 so as to move the parts thereof to an "open" position. This will permit fuel to flow through the fuel conduit 324 to the bore 312. During initial operation of the engine its temperature as well as the temperature of the housing H' will be below a predetermined value. The bimetallic sensing element 220 will at this time maintain the blocking element 214 in its solid outline position of Figure 5. Accordingly, fuel will be free to flow through the bore 312 into the passage 308. This fuel will enter the venturi V' mixed with fresh air from the housing space 36'.

At such time as the operating temperatures within the housing H' reaches a predetermined value, the bimetallic temperature sensing element 320 will raise the blocking element 314 until its upper end seats against the lower end of the bore 312. Upon such occurrence, the flow of fuel through the bore 312 and thus into the housing H' will be blocked.

*The apparatus of Figure 6*

Referring to Figure 6, there is shown a modified form of afterburner apparatus particularly adapted for use with a spark ignition type engine. This apparatus is in general similar to that of Figures 1–4 and like parts bear doubled primed reference numerals. In this construction, the control valve C" is not positioned in the fresh air inlet tube 28". Instead, this tube is free of any obstructions, and the control valve C" is mounted in the inlet tube 164" of the pump P"', by a horizontally extending shaft 400. A short crank 402 is keyed to this horizontal shaft 400 exteriorly of the inlet tube. The shaft 400 is also keyed to a downwardly extending lever 403 formed at its lower portion with a slot 405. The free end of this crank 402 is pivotally affixed to the lower end of a rod 404. The upper end of this rod 404 is secured to the center of a flexible diaphragm 406. This diaphragm 406 may be formed of any suitable material, such as fabric, plastic or metal and is disposed within a casing 408 that is affixed to the inlet tube 164" by a bracket 410. The diaphragm 406 divides the interior of the casing 408 into a front portion 412 and a rear portion 414.

This front portion 412 of the casing is vented to the atmosphere, while the rear portion 414 thereof is in communication with the intake manifold pressure of the engine by a conduit 416. The rear of the casing 408 is formed with an internally threaded boss 418 wherein is disposed an adjustable set screw 420. A coil compression spring 422 is interposed between the underside of this adjustment set screw 420 and the mid-portion of the diaphragm 406. A threaded plug 424 closes the open end of the boss 418. An electric solenoid 426 is affixed to the underside of the inlet tube 164". This solenoid 426 includes a plunger 428 which is maintained in its extended position of Figure 6 while its windings remain unexcited. When the windings are excited, the plunger 428 will be retracted into the windings, or to the left relative to Figure 6. The end of the plunger 428 remote from the windings is threaded and carries an adjustment nut 430 and a lock nut 432. The plunger 428 extends through the slot 405 formed in the lower portion of the lever 403. With this arrangement, at such time as electric current is connected to the solenoid 426, the lever 403 will be pivoted clockwise from its position of Figure 6 so as to effect concurrent clockwise rotation of the control valve C" towards an open position. One side of the windings of the solenoid 426 is connected to terminal 137" of the electric microswitch 133" by a lead 440. The opposite side of these windings are grounded by means of a second lead 442. The remainder of the apparatus corresponds to the arrangement described hereinbefore with regard to Figures 1–4.

*Operation of the apparatus of Figure 6*

In the operation of the modified apparatus of Figure 6, assuming the engine is initially cold, the bimetallic strip 130" will be arranged in its position of Figure 1. Accordingly, the microswitch 133" will have its parts arranged in an "on" position. When the ignition switch 154" is turned on, the fuel shut-off member S" and the fuel admitting member F" will cooperate to admit heated fuel into the throat 42" of the venturi V". Since the microswitch 133" is at this time arranged in its "on" position, electric current will be free to flow from the source B" to the windings of the electric solenoid 426. The latter will thus be excited and the plunger 428 will be arranged in a retracted position. Accordingly, the plunger will maintain the control valve C" in an open position. The control valve C" will admit fresh air into the pump P"'. This air will, in the manner described hereinabove in conjunction with the description of Figures 1 through 4, be forced into the space 36" of the housing H", mixed with the heated fuel from the fuel admitting member F" and forced into the throat 42" of the venturi V". This condition will continue until the temperature within the housing H' reaches a predetermined maximum at which time the bimetallic temperature sensing element 130" will act to move the parts of the electric microswitch 133" to their "off" position. Upon such occurrence, the flow of heated fuel to the venturi V" will stop. Additionally, upon such occurrence, the flow of current to the windings of the electric solenoid 426 will be cut off. The plunger 428 will then move forwardly to its extended position of Figure 6 and any further movement of the control valve C" will be effected independently of the solenoid 426 because of the lost-motion interconnection of the latter and the control valve.

Thereafter during operation of the engine, the value of its intake manifold pressure will control the degree of opening of the control valve C". Thus, during engine operating conditions involving intake manifold pressure higher than a predetermined value the strength of the spring 422 is sufficient to maintain the control valve C" closed. When, however, the intake manifold vacuum reaches a predetermined maximum, the diaphragm 406 will be flexed towards the spring 422 so as to effect clockwise movement of the control valve C" and thereby admit fresh air into the intake of the pump P"'.

It should be particularly observed that while the control valve C" is disposed in its closed position, fresh air will be cut off from the pump P" whereby less power is required to effect its rotation. As noted hereinabove, fresh air will be admitted to the pump P" only during high vacuum conditions within the engine. Such high vacuum conditions generally occur during idling and deceleration. It has been determined that the highest percentage of contaminants are contained in the exhaust gases during idling and deceleration conditions. Accordingly, with this arrangement, the maximum amount of fresh air will automatically be admitted during the time when it is most needed.

Various modifications and changes may be made with regard to the foregoing detailed description without departing from the spirit of the invention or the scope of the following claims.

I claim:

1. Afterburner apparatus for use with an internal combustion engine having an exhaust, comprising: a housing formed with a burning chamber in communication with said exhaust; means for supplying fresh air to said burning chamber; a fuel admitting member connected to said housing that admits fuel to said burning chamber, said member being formed with a passage through which flows at least a portion of said fresh air whereby the fresh air flowing through said passage is in heat transfer relationship with said fuel; heating means disposed in communication with said passage; and temperature responsive means on said housing and operatively connected to said fuel admitting member and said heating means so as to render them inoperative when the temperature within said burning chamber is raised to a predetermined value.

2. Afterburner apparatus for use with an internal combustion engine having an exhaust, comprising: a housing formed with a burning chamber in communication with said exhaust; a venturi tube interposed between said burning chamber and said exhaust, the throat of said venturi tube being formed with opening means; fresh air pumping means driven by said engine; conduit means connecting said pump means with said opening means; a control valve mounted in said conduit means; and automatic means for actuating said control valve responsive to the throttle setting and power output being produced by said engine.

3. Afterburner apparatus as set forth in claim 2 wherein said automatic means will cause the extent of opening of said control valve to be decreased in response to an increase in exhaust gas velocity.

4. Afterburner apparatus as set forth in claim 3 wherein said automatic means includes velocity sensing means exposed to the flow of exhaust gases from said engine.

5. Afterburner apparatus as set forth in claim 4 wherein said sensing means includes an unbalanced butterfly valve.

6. Afterburner apparatus for use with an internal combustion engine having an exhaust, comprising: a housing formed with a burning chamber in communication with said exhaust; a venturi tube interposed between said burning chamber and said exhaust, the throat of said venturi tube being formed with opening means; fresh air pumping means driven by said engine; conduit means connecting said pump means with said opening means; a control valve in said conduit means to vary the flow rate through said conduit means; and automatic means for actuating said control valve, said means causing the extent of opening of said valve to be increased during idling and deceleration of said engine.

7. Afterburner apparatus as set forth in claim 6 wherein said automatic means includes a pressure responsive member having communication with the intake manifold pressure of said engine.

8. Afterburner apparatus for use with an internal combustion engine having an exhaust, comprising: a housing formed with a burning chamber in communication with said exhaust; a venturi tube interposed between said burning chamber and said exhaust, the throat of said venturi tube being formed with opening means; fresh air pumping means driven by said engine; conduit means connecting said pump means with said opening means; a control valve in said conduit means to vary the flow rate through said conduit means; automatic means for actuating said control valve responsive to the operating conditions of said engine; and means for admitting fresh air into said conduit means independently of said automatical means until the operating temperature of said engine is raised to a predetermined value.

9. Afterburner apparatus as set forth in claim 8 wherein said automatic means includes a pressure responsive member having communication with the intake manifold pressure of said engine.

10. Afterburner apparatus for use with an internal combustion engine having an exhaust, comprising: a housing formed with a burning chamber in communication with said exhaust; a venturi tube interposed between said burning chamber and said exhaust, the throat of said venturi tube being formed with opening means; fresh air pumping means driven by said engine; conduit means connecting said pump means with said opening means; a control valve in said conduit means to vary the volume of fresh air admitted to said pump means; and automatic means for actuating said control valve responsive to the throttle setting and power output being produced by said engine.

11. Afterburner apparatus for use with an internal combustion engine having an exhaust, comprising: a housing formed with a burning chamber in communication with said exhaust; a venturi tube interposed between said burning chamber and said exhaust, the throat of said venturi tube being formed with opening means; fresh air pumping means driven by said engine; conduit means connecting said pump means with said opening means; a control valve in said conduit means to vary the volume of fresh air admitted to said pump means; and automatic means for actuating said control valve, said means causing the extent of opening of said valve to be increased during idling and deceleration of said engine.

12. Afterburner apparatus for use with an internal combustion engine having an exhaust, comprising: a housing formed with a burning chamber in communication with said exhaust; a venturi tube interposed between said burning chamber and said exhaust, the throat of said venturi tube being formed with opening means; fresh air pumping means driven by said engine; conduit means connecting said pump means with said opening means; a control valve in said conduit means to vary the volume of fresh air admitted to said pump means; automatic means for actuating said control valve, said means causing the extent of opening of said valve to be increased during idling and deceleration of said engine; and means for admitting fresh air into said conduit means independently of said automatic means until the operating temperature of said engine is raised to a predetermined value.

13. Afterburner apparatus for use with an internal combustion engine having an exhaust, comprising: a housing formed with a burning chamber in communication with said exhaust; a venturi tube interposed between said burning chamber and said exhaust, the throat of said venturi tube being formed with opening means; fresh air pumping means driven by said engine; conduit means connecting said pump means with said opening means; a control valve in said conduit means to vary the volume of flow through said conduit means; automatic means for actuating said control valve responsive to the throttle setting and power output being produced by said engine; electric solenoid means; a lost-motion connection between said solenoid means and said control valve whereby upon energization of said solenoid said control valve will be opened independently of said automotic means; and temperature responsive electric switch means exposed to the heat generated by said engine to energize said solenoid until the operating temperature of said engine is raised to a predetermined value.

14. Afterburner apparatus for use with an internal combustion engine having an exhaust, comprising: a housing formed with a burning chamber in communication with said exhaust; a venturi tube interposed between said burning chamber and said exhaust, the throat of said venturi tube being formed with opening means; fresh air pumping means driven by said engine; conduit means connecting said pump means with said opening means; a control valve in said conduit means to vary the volume of flow through said conduit means; automatic means for actuating said control valve, said means causing the extent of opening of said valve to be increased during idling and deceleration of said engine; electric solenoid means; a lost-motion connection between said solenoid means and said control valve whereby upon energization of said solenoid said control valve will be opened independently of said automatic means; and temperature responsive electric switch means exposed to the heat generated by said engine to energize said solenoid until the operating temperature of said engine is raised to a predetermined value.

15. Afterburner apparatus as set forth in claim 14 wherein said automatic means includes a pressure responsive member having communication with the intake manifold pressure of said engine.

16. Afterburner apparatus for use with an internal combustion engine having an exhaust, comprising: a housing formed with a burning chamber in communication with said exhaust; a venturi tube interposed between said burning chamber and said exhaust, the throat of said venturi tube being formed with opening means; fresh air pumping means driven by said engine; conduit means connecting said pump means wtih said opening means; a control valve in said conduit means to vary the volume of fresh air admitted to said pump means; automatic means for actuating said control valve responsive to the throttle setting and power output being produced by said engine; electric solenoid means; a lost-motion connection between said solenoid means and said control valve whereby upon energization of said solenoid said control valve will be opened independently of said automatic means; and temperature responsive electric switch means exposed to the heat generated by said engine to energize said solenoid until the operating temperature of said engine is raised to a predetermined value.

17. Afterburner apparatus as set forth in claim 16 wherein said automatic means includes a pressure responsive member having communication with the intake manifold pressure of said engine.

18. Afterburner apparatus for use with an internal combustion engine having an exhaust, comprising: a housing formed with a burning chamber in communication with said exhaust; a venturi interposed between said burning chamber and said exhaust to draw fresh air into said burning chamber; conduit means connecting the throat of said venturi with the atmosphere; a control valve in said conduit means for varying the flow through said conduit means; automatic means for actuating said control valve responsive to the throttle setting and power output being produced by said engine; and means for admitting fresh air into said conduit means independently of said automatic means until the operating temperature of said engine is raised to a predetermined value.

19. Afterburner apparatus for use with an internal combustion engine having an exhaust, comprising: a housing formed with a burning chamber in communication with said exhaust; a venturi interposed between said burning chamber and said exhaust to draw fresh air into said burning chamber; conduit means connecting the throat of said venturi with the atmosphere; a control valve in said conduit means for varying the flow through said conduit means; automatic means for actuating said control valve responsive to the operating conditions of said engine; electric solenoid means; a lost-motion connection between said solenoid means and said control valve whereby upon energization of said solenoid said control valve will be opened independently of said automatic means; and temperature responsive electric switch means exposed to the heat generated by said engine to energize said solenoid until the operating temperature of said engine is raised to a predetermined value.

20. Afterburner apparatus for use with an internal combustion engine having an exhaust, comprising: a housing formed with a burning chamber in communication with said exhaust; fresh air pumping means driven by said engine; conduit means connecting said pumping means with said burning chamber; a control valve in said conduit means for varying the flow through said conduit means; automatic means for actuating said control valve responsive to the throttle setting and power output being produced by said engine; and means for admitting fresh air into said conduit means independently of said automatic means until the operating temperature of said engine is raised to a predetermined value.

21. Afterburner apparatus for use with an internal combustion engine having an exhaust, comprising: a housing formed with a burning chamber in communication with said exhaust; fresh air pumping means driven by said engine; conduit means connecting said pumping means with said burning chamber; a control valve in said conduit means for varying the flow through said conduit means; automatic means for actuating said control valve responsive to the throttle setting and power output being produced by said engine; electric solenoid means; a lost-motion connection between said solenoid means and said control valve whereby upon energization of said solenoid said control valve will be opened independently of said automatic means; and temperature responsive electric switch means exposed to the heat generated by said engine to energize said solenoid until the operating temperature of said engine is raised to a predetermined value.

22. Afterburner apparatus for use with an internal combustion engine having an exhaust, comprising a housing formed with a burning chamber in communication with said exhaust; a fuel admitting member on said housing formed with a passage through which fuel flows to reach said burning chamber; heating means on said housing and in heat-transfer relationship with said passage for heating the fuel supplied to said burning chamber by said fuel admitting member; and temperature responsive means on said housing and operatively connected to said fuel admitting member and to said heating means so as to automatically render them inoperative when the temperature within said burning chamber is raised to a predetermined value.

23. Afterburner apparatus for use with an internal combustion engine having an exhaust, comprising: a housing formed with a burning chamber in communication with said exhaust; fresh air supply means actuated by said engine; conduit means connecting said air supply means with said burning chamber; a control valve mounted in said conduit means; automatic means for actuating said control valve responsive to the throttle setting and power output being produced by said engine; a fuel admitting member on said housing that admits fuel to said burning chamber; and temperature responsive means associated with said housing and operatively connected to said fuel admitting member to control the flow of fuel therethrough.

24. Afterburner apparatus for use with an internal combustion engine having an exhaust, comprising: a housing formed with a burning chamber in communication with said exhaust; fresh air supply means actuated by said engine; conduit means connecting said air supply means with said burning chamber; a control valve mounted in said conduit means; automatic means for actuating said control valve responsive to the throttle setting and power output being produced by said engine; a fuel admitting member on said housing that admits fuel to said burning chamber; temperature responsive means associated with said housing and operatively connected to said fuel admitting member to control the flow of fuel therethrough; and fuel heating means on said housing that heats the fuel supplied to said burning chamber by said fuel admitting member.

25. Afterburner apparatus for use with an internal combustion engine having an exhaust, comprising: a housing formed with a burning chamber in communication with said exhaust; fresh air supply means actuated by said engine; conduit means connecting said air supply means with said burning chamber; a control valve mounted in said conduit means; automatic means for actuating said control valve responsive to the throttle setting and power output being produced by said engine; a fuel admitting member on said housing that admits fuel to said burning chamber; and fuel heating means on said housing that heats the fuel supplied to said burning chamber by said fuel admitting member.

References Cited in the file of this patent

UNITED STATES PATENTS

| | | |
|---|---|---|
| 1,824,820 | Hynes | Sept. 29, 1931 |
| 1,847,506 | White | Mar. 1, 1932 |
| 1,875,024 | Kryzanowsky | Aug. 30, 1932 |
| 1,931,542 | Hesselman | Oct. 24, 1933 |
| 2,038,567 | Ittner | Apr. 28, 1936 |
| 2,071,119 | Harger | Feb. 16, 1937 |
| 2,658,742 | Suter et al. | Nov. 10, 1953 |
| 2,667,031 | Ryder | Jan. 26, 1954 |
| 2,704,438 | Sheets | Mar. 22, 1955 |
| 2,806,346 | Clayton | Sept. 17, 1957 |
| 2,807,930 | Bratton | Oct. 1, 1957 |

FOREIGN PATENTS

| | | |
|---|---|---|
| 60,247 | Netherlands | Nov. 15, 1947 |